US012647836B2

(12) United States Patent
Zhang et al.

(10) Patent No.: US 12,647,836 B2
(45) Date of Patent: Jun. 2, 2026

(54) METHODS AND APPARATUSES FOR HANDLING A MBS AT A RAN NODE

(71) Applicant: Lenovo (Beijing) Limited, Beijing (CN)

(72) Inventors: Congchi Zhang, Shanghai (CN); Mingzeng Dai, Shanghai (CN); Lianhai Wu, Beijing (CN); Le Yan, Shanghai (CN); Hyung-Nam Choi, Ottobrunn (DE); Prateek Basu Mallick, Dreieich (DE); Joachim Löhr, Wiesbaden (DE)

(73) Assignee: Lenovo (Beijing) Limited, Beijing (CN)

( * ) Notice: Subject to any disclaimer, the term of this patent is extended or adjusted under 35 U.S.C. 154(b) by 332 days.

(21) Appl. No.: 18/260,637

(22) PCT Filed: Jan. 8, 2021

(86) PCT No.: PCT/CN2021/070928
§ 371 (c)(1),
(2) Date: Jul. 7, 2023

(87) PCT Pub. No.: WO2022/147782
PCT Pub. Date: Jul. 14, 2022

(65) Prior Publication Data
US 2024/0056902 A1    Feb. 15, 2024

(51) Int. Cl.
*H04W 36/00* (2009.01)
(52) U.S. Cl.
CPC ... *H04W 36/0007* (2018.08); *H04W 36/0044* (2013.01); *H04W 36/00698* (2023.05)

(58) Field of Classification Search
CPC ......... H04W 36/0007; H04W 36/0044; H04W 36/00698; H04W 4/06
See application file for complete search history.

(56) References Cited

U.S. PATENT DOCUMENTS

| | | | | |
|---|---|---|---|---|
| 2021/0185566 A1* | 6/2021 | Zhu | ......................... | H04W 4/70 |
| 2023/0049140 A1* | 2/2023 | Wu | ...................... | H04W 76/19 |
| 2023/0403760 A1* | 12/2023 | Pham Van | ............ | H04W 76/40 |

FOREIGN PATENT DOCUMENTS

| | | |
|---|---|---|
| CN | 101473592 A | 7/2009 |
| CN | 102484775 A | 5/2012 |

(Continued)

OTHER PUBLICATIONS

PCT/CN2021/070928 , "International Preliminary Report on Patentability", PCT Application No. PCT/CN2021/070928, Jul. 20, 2023, 5 pages.

(Continued)

*Primary Examiner* — Jamal Javaid
(74) *Attorney, Agent, or Firm* — FIG. 1 Patents

(57)    ABSTRACT

Embodiments of the present application relate to methods and apparatuses for handling a service belonging to a multicast broadcast service (MBS) at a radio access network (RAN) node under a 3rd Generation Partnership Project (3GPP) 5G system or the like. According to an embodiment of the present application, a method can include: receiving information relating to one or more on-going MBS associated with a UE at one or more RAN nodes; and receiving configuration information from another RAN node, so that at least some or all of data relating to at least one of the one or more on-going MB S associated with the UE can be provided by the abovementioned another RAN node.

20 Claims, 7 Drawing Sheets

(56)                    References Cited

FOREIGN PATENT DOCUMENTS

| | | | |
|---|---|---|---|
| CN | 111866975 | A | 10/2020 |
| EP | 1326462 | A2 | 7/2003 |
| EP | 2852240 | B1 | 9/2016 |

OTHER PUBLICATIONS

PCT/CN2021/070928 , "International Search Report and Written Opinion", PCT Application No. PCT/CN2021/070928, Sep. 27, 2021, 7 pages.

* cited by examiner receiving, by a RAN node, information relating to one or more on-going MBS associated with a UE at one or more RAN nodes transmitting configuration information to another RAN node, so that at least some or all of data relating to at least one of the one or more on-going MBS associated with the UE can be provided by the RAN node

1200

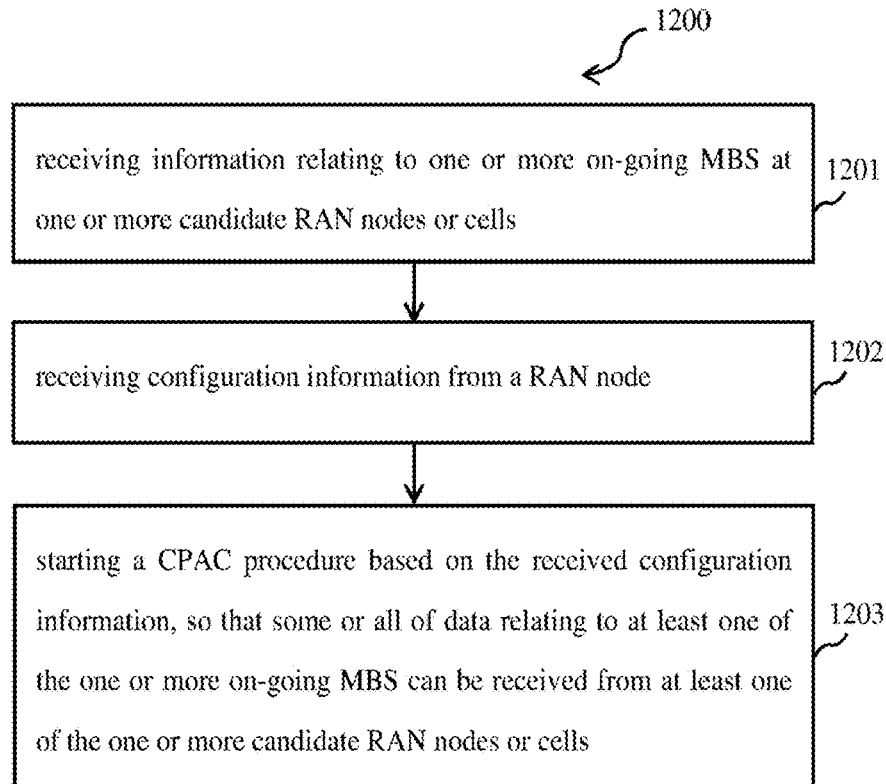

receiving information relating to one or more on-going MBS at one or more candidate RAN nodes or cells        1201 receiving configuration information from a RAN node        1202 starting a CPAC procedure based on the received configuration information, so that some or all of data relating to at least one of the one or more on-going MBS can be received from at least one of the one or more candidate RAN nodes or cells        1203

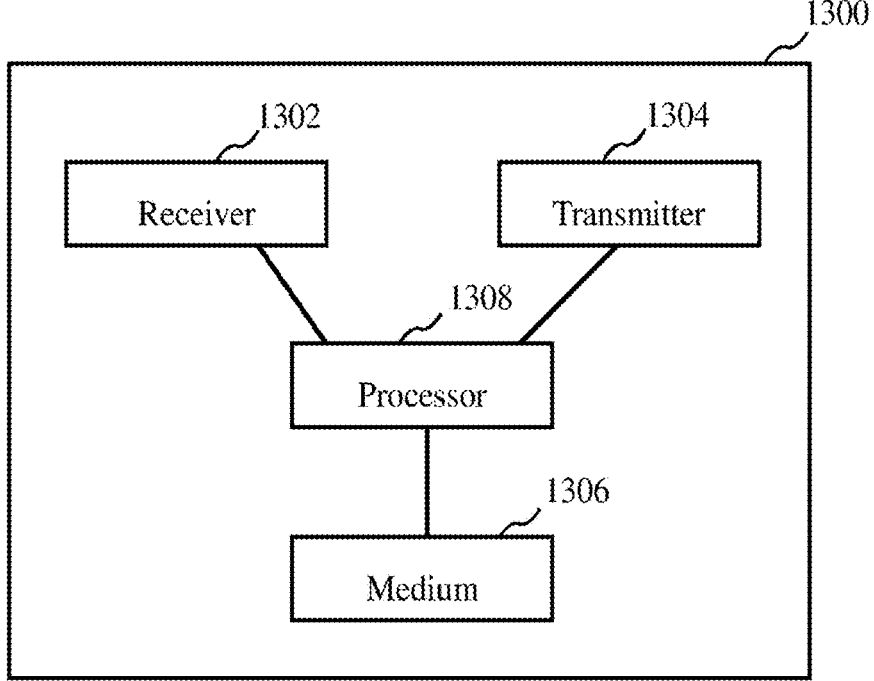

1302        1304
Receiver        Transmitter

1308
Processor

1306
Medium

FIG. 13

METHODS AND APPARATUSES FOR HANDLING A MBS AT A RAN NODE

TECHNICAL FIELD

Embodiments of the present application generally relate to wireless communication technology, especially to methods and apparatuses for handling a multicast broadcast service (MBS) at a radio access network (RAN) node.

BACKGROUND

A base station (BS) can have some cells (or areas) to provide communication service. When a user equipment (UE) moves from a serving cell of a source BS to a target cell of a target BS, a handover procedure is performed. For example, in a RAN, a UE may handover from a serving cell of a source RAN node to a target cell of a target RAN node.

Next generation radio access network (NG-RAN) supports a multi-radio dual connectivity (MR-DC) operation. In a MR-DC scenario, a UE with multiple transceivers may be configured to utilize resources provided by two different nodes connected via non-ideal backhauls. Wherein one node may provide new radio (NR) access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3rd Generation Partnership Project (3GPP) standard documents), and at least the MN is connected to the core network.

Currently, in a 3GPP 5G system or network, details of a mechanism for a RAN node handling a MBS at another RAN node in a handover scenario or in a MR-DC scenario have not been discussed in 3GPP 5G technology yet.

SUMMARY

Some embodiments of the present application provide a method for wireless communications. The method may be performed by a radio access network (RAN) node, e.g., a MN in a MR-DC scenario. The method comprises: receiving information relating to one or more on-going MBS associated with a UE at one or more RAN nodes; and receiving configuration information from another RAN node, so that at least some or all of data relating to at least one of the one or more on-going MBS associated with the UE can be provided by the abovementioned another RAN node.

Some embodiments of the present application provide an apparatus for wireless communications. The apparatus comprises: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the abovementioned method performed by a RAN node.

Some embodiments of the present application provide a RAN node. The RAN node comprises a processor and a wireless radio transceiver coupled to the processor, wherein the wireless radio transceiver is configured to: receive information relating to one or more on-going MBS associated with a UE at one or more RAN nodes; and receive configuration information from another RAN node, so that at least some or all of data relating to at least one of the one or more on-going MBS associated with the UE can be provided by the abovementioned another RAN node.

Some embodiments of the present application provide a further method for wireless communications. The further method may be performed by a RAN node, e.g., a SN in a MR-DC scenario. The method comprises: receiving information relating to one or more on-going MBS associated with a UE at one or more RAN nodes; and transmitting configuration information to another RAN node, so that at least some or all of data relating to at least one of the one or more on-going MBS associated with the UE can be provided by the RAN node.

Some embodiments of the present application provide a further apparatus for wireless communications. The further apparatus comprises: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the abovementioned further method performed by a RAN node.

Some embodiments of the present application provide a further RAN node. The further RAN node comprises a processor and a wireless radio transceiver coupled to the processor, wherein the wireless radio transceiver is configured to: receive information relating to one or more on-going MBS associated with a UE at one or more RAN nodes; and transmit configuration information to another RAN node, so that at least some or all of data relating to at least one of the one or more on-going MBS associated with the UE can be provided by the further RAN node.

Some embodiments of the present application provide another method for wireless communications. The method may be performed by a UE. The method comprises: receiving information relating to one or more on-going MBS at one or more candidate RAN nodes or cells; receiving configuration information from a RAN node; and starting a conditional primary secondary cell (PSCell) additional and change (CPAC) procedure based on the received configuration information, so that some or all of data relating to at least one of the one or more on-going MBS can be received from at least one of the one or more candidate RAN nodes or cells.

Some embodiments of the present application provide another apparatus for wireless communications. The abovementioned another apparatus comprises: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the abovementioned another method performed by a UE.

Some embodiments of the present application provide a UE. The UE comprises a processor and a wireless radio transceiver coupled to the processor, wherein the wireless radio transceiver is configured to: receive information relating to one or more on-going MBS at one or more candidate RAN nodes or cells; receive configuration information from a RAN node; and start a CPAC procedure based on the received configuration information, so that some or all of data relating to at least one of the one or more on-going MBS can be received from at least one of the one or more candidate RAN nodes or cells.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 12 illustrates an exemplary flowchart of a method for receiving information relating to an on-going MBS service at a candidate RAN node or cell in accordance with some embodiments of the present application; and FIG. 13 illustrates an exemplary block diagram of an apparatus according to some embodiments of the present application.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
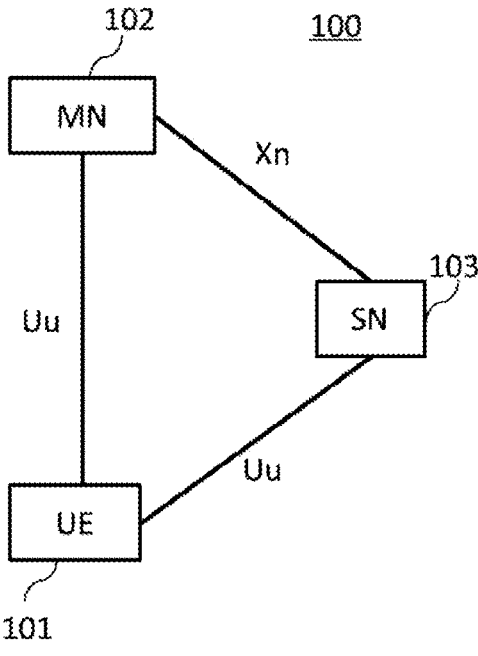
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 may be a dual connectivity system 100, including at least one UE 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, UE 101 may be connected to MN 102 and SN 103 via a network interface, for example, the Uu interface as specified in 3GPP standard documents. MN 102 and SN 103 may be connected with each other via a network interface, for example, the Xn interface as specified in 3GPP standard documents. MN 102 may be connected to the core network via a network interface (not shown in FIG. 1). UE 102 may be configured to utilize resources provided by MN 102 and SN 103 to perform data transmission.

MN 102 may refer to a radio access node that provides a control plane connection to the core network. In an embodiment of the present application, in the E-UTRA-NR Dual Connectivity (EN-DC) scenario, MN 102 may be an eNB. In another embodiment of the present application, in the next generation E-UTRA-NR Dual Connectivity (NGEN-DC) scenario, MN 102 may be an ng-eNB. In yet another embodiment of the present application, in the NR-E-UTRA Dual Connectivity (NE-DC) scenario or the NR-NR Dual Connectivity (NR-DC) scenario, MN 102 may be a gNB.

MN 102 may be associated with a master cell group (MCG). The MCG may refer to a group of serving cells associated with MN 102, and may include a primary cell (PCell) and optionally one or more secondary cells (SCells) of the MCG. The PCell may provide a control plane connection to UE 101.

SN 103 may refer to a radio access node without a control plane connection to the core network but providing additional resources to UE 101. In an embodiment of the present application, in the EN-DC scenario, SN 103 may be an en-gNB. In another embodiment of the present application, in the NE-DC scenario, SN 103 may be a ng-eNB. In yet another embodiment of the present application, in the NR-DC scenario or the NGEN-DC scenario, SN 103 may be a gNB.

SN 103 may be associated with a secondary cell group (SCG). The SCG may refer to a group of serving cells associated with SN 103, and may include a primary secondary cell (PSCell) and optionally one or more secondary cells (SCells). The PCell of the MCG and the PSCell of the SCG may also be referred to as a special cell (SpCell).

In some embodiments of the present application, UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network. In some other embodiments of the present application, UE 101 may include wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

As described above, in a MR-DC scenario, a UE is connected to a MN and a SN. To utilize resource(s) in the SN and improve the overall data rate and reliability, the MN can decide to offload a certain quality of service (QoS) flow to the SN or create a split radio bearer to support a QoS flow at the MN.

Figure 2A:
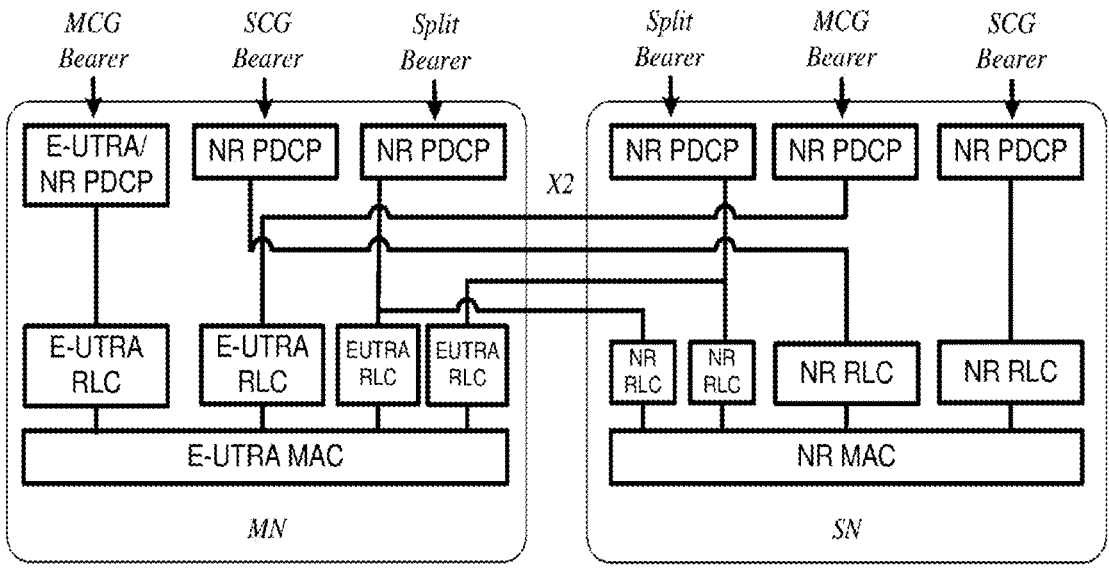
FIG. 2A illustrates a network side protocol termination options for a master cell group (MCG) bearer, a secondary cell group (SCG) bearer, and a split bearer in a MR-DC scenario with EPC (EN-DC) in accordance with 3GPP standard document TS37.340.

From a perspective of a network, each bearer (a MCG bearer, a SCG bearer, and a split bearer) can be terminated either in a MN or in a SN. As specified in 3GPP standard document TS37.340, network side protocol termination options are shown in FIG. 2A for a MR-DC with EPC (EN-DC) and in FIG. 2B for a MR-DC with 5GC (NGEN-DC, NE-DC and NR-DC). In general, a radio bearer configured with a service data adaptation protocol (SDAP) and a packet data convergence protocol (PDCP) entity located in the MN or the SN is considered as "a MN terminated radio bearer" or "a SN terminated radio bearer". A radio bearer configured with a radio link control (RLC) and a medium access control (MAC) entity located in MN or SN is considered as a MCG bearer or a SCG bearer. Thus, there are six types of radio bearers which can be configured in a MR-DC scenario: (1) a SN terminated MCG bearer; (2) a SN terminated SCG bearer; (3) a MN terminated MCG bearer;

(4) a MN terminated SCG bearer; (5) a MN terminated split bearer; and (6) a SN terminated split bearer.

FIG. 2A illustrates a network side protocol termination options for a master cell group (MCG) bearer, a secondary cell group (SCG) bearer, and a split bearer in a MR-DC scenario with EPC (EN-DC) in accordance with 3GPP standard document TS37.340. As shown in FIG. 2A, there are six types of radio bearers which can be configured in MR-DC scenario for a EPC case:

(1) MN terminated MCG bearer, with PDCP, RLC, and MAC located at MN.

(2) MN terminated SCG bearer, with PDCP located at MN while RLC and MAC located at SN.

(3) MN terminated split bearer, with PDCP located at MN while one RLC leg at MN and another RLC leg at SN.

(4) SN terminated split bearer, with PDCP located at SN while one RLC leg at MN and another RLC leg at SN.

(5) SN terminated MCG bearer, with PDCP located at SN while RLC and MAC located at MN.

(6) SN terminated SCG bearer, with PDCP, RLC, and MAC located at SN.

Figure 2B:
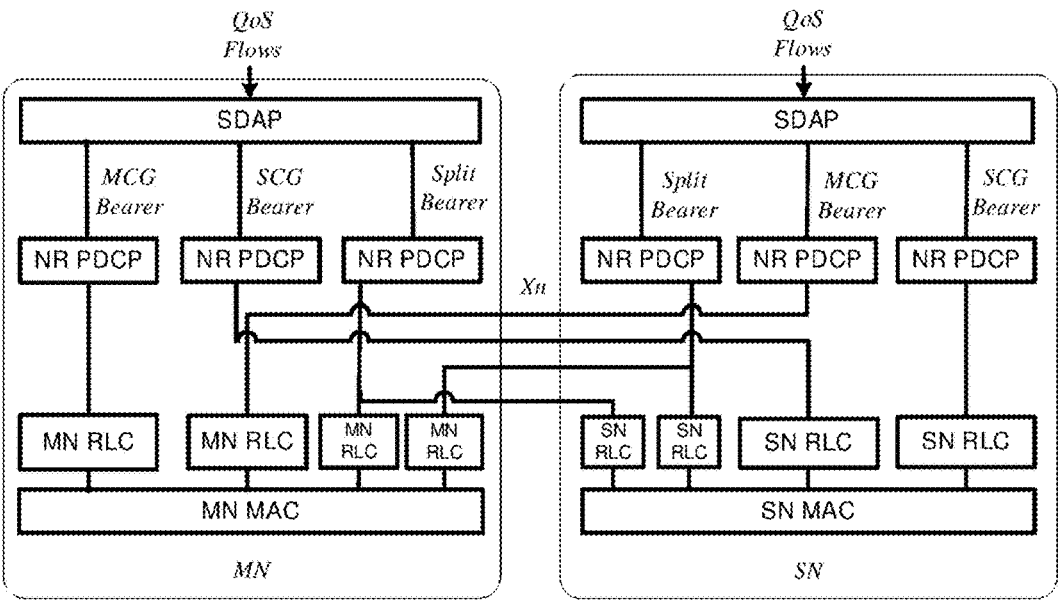
FIG. 2B illustrates a network side protocol termination options for MCG, SCG and split bearers in a MR-DC scenario with 5GC (NGEN-DC, NE-DC and NR-DC) in accordance with 3GPP standard document TS37.340.

FIG. 2B illustrates a network side protocol termination options for MCG, SCG and split bearers in a MR-DC scenario with 5GC (NGEN-DC, NE-DC and NR-DC) in accordance with 3GPP standard document TS37.340. As shown in FIG. 2B, there are six types of radio bearers which can be configured in MR-DC scenario for a 5GC (5G core network) case:

(1) MN terminated MCG bearer, with SDAP and PDCP, RLC, and MAC located at MN.

(2) MN terminated SCG bearer, with SDAP and PDCP located at MN while RLC and MAC located at SN.

(3) MN terminated split bearer, with SDAP and PDCP located at MN while one RLC leg at MN and another RLC leg at SN.

(4) SN terminated split bearer, with (SDAP and) PDCP located at SN while one RLC leg at MN and another RLC leg at SN (5) SN terminated MCG bearer, with SDAP and PDCP located at SN while RLC and MAC located at MN.

(6) SN terminated SCG bearer, with SDAP and PDCP, RLC, and MAC located at SN.

According to 3GPP standard documents, agreements regarding MBS traffic delivery methods are as follows. MBS traffic needs to be delivered from a single data source (application service provider) to multiple UEs. Depending on many factors, multiple delivery methods may be used to deliver MBS traffic in the 5GS.

From the viewpoint of a 5GC case, following two delivery methods are possible for a MBS multicast service:

(1) 5GC individual MBS traffic delivery method: a 5GC receives a single copy of MBS data packets and delivers separate copies of those MBS data packets to individual UEs via per-UE PDU sessions, hence for each such UE one PDU session is required to be associated with a multicast session.

(2) 5GC shared MBS traffic delivery method: a 5GC receives a single copy of MBS data packets and delivers a single copy of those MBS packets packet to a RAN node, which then delivers them to one or multiple UEs.

If 5GC individual MBS traffic delivery method is supported, a same received single copy of MBS data packets by the 5GC may be delivered via both "5GC individual MBS traffic delivery method" for some UE(s) and "5GC shared MBS traffic delivery method" for some other UE(s).

From the viewpoint of a RAN, in the 5GC shared MBS traffic delivery case, following two delivery methods are available for the transmission of MBS packet flows over radio:

(1) Point-to-Point (PTP) delivery method: a RAN node delivers separate copies of MBS data packet over radio to individual UE.

(2) "Point-to-Multipoint (PTM) delivery method: a RAN node delivers a single copy of MBS data packets over radio to a set of UEs.

A RAN node may use a combination of "PTP delivery method" and "PTM delivery method" to deliver an MBS packet to UE(s).

For a MBS broadcast service, only 5GC shared MBS traffic delivery method with PTM delivery is applicable. From a RAN's point of view, 3GPP RAN2 working group specifies two modes for NR MBS delivery: (1) one delivery mode for high QoS (reliability, latency) requirement, to be available in RRC CONNECTED state (possibly the UE can switch to other states when there is no data reception); and (2) one delivery mode for "low" QoS requirement, wherein the UE can also receive data in RRC INACTIVE or IDLE state.

Figure 3:
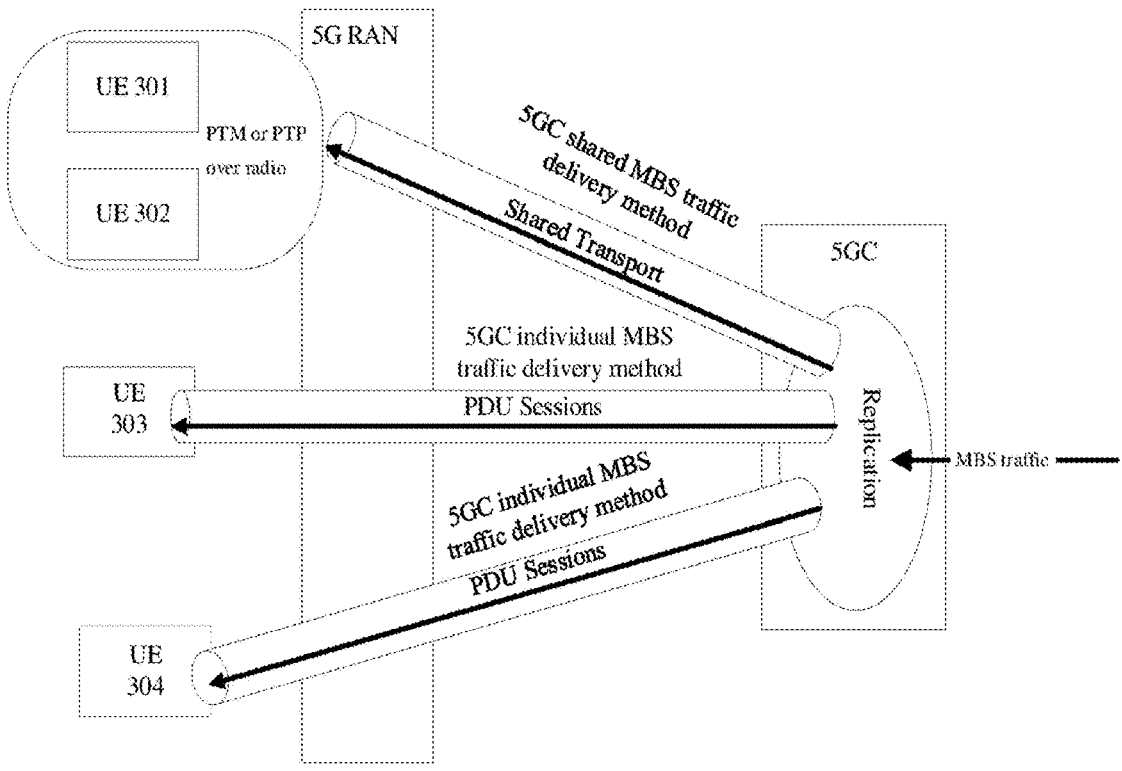
FIG. 3 illustrates exemplary delivery methods for transmitting multicast broadcast service (MBS) packet flows in accordance with some embodiments of the present application.

FIG. 3 illustrates exemplary delivery methods for transmitting multicast broadcast service (MBS) packet flows in accordance with some embodiments of the present application.

In the embodiments of FIG. 3, "5GC shared MBS traffic delivery method" (with "PTP delivery method" or "PTM delivery method") and "5GC individual MBS traffic delivery method" may be used at the same time for a multicast MBS session. In particular, as shown in FIG. 3, replications of MBS traffic are transmitted from 5GC, via 5G RAN, to UE 301, UE 302, UE 303, and UE 304, respectively. For example, replications of MBS traffic are transmitted to UE 301 and UE 302 through "5GC shared MBS traffic delivery method", which uses "Shared Transport", replications of MBS traffic are transmitted to UE 303 through "5GC individual MBS traffic delivery method", which uses "PDU sessions", and replications of MBS traffic are transmitted to UE 304 through "5GC individual MBS traffic delivery method", which uses "PDU sessions".

According to 3GPP standard documents, agreements of a PDU session split at an user plane function (UPF) (i.e., RAN initiated QoS flows offloading from a MN to a SN) are as follows. When some QoS flows are offloaded from a MN to a SN, the MN may decide to split a PDU session served by the MN into two or more user plane interface between NG-RAN and 5GC (NG-U) tunnels. The MN sends the SN Addition Request message or the SN Modification Request message that includes an UPF uplink (UL) tunnel endpoint identifier (TEID) address used at the MN. Later on, if the MN receives a new UL TEID in the PDU Session Resource Modify Confirm message, the MN may provide the new UL TEID to the SN.

Figure 4:
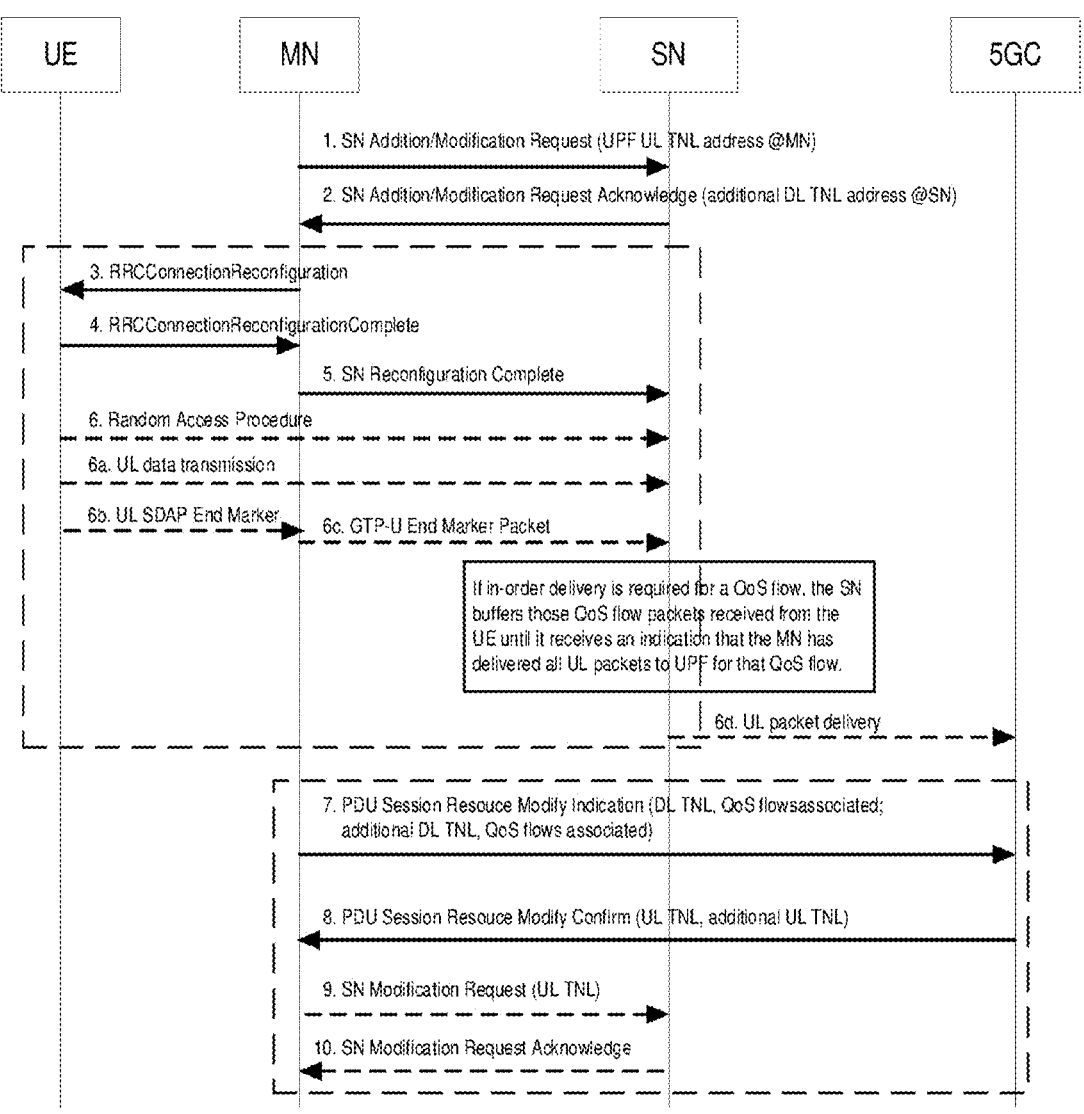
FIG. 4 illustrates an exemplary packet data unit (PDU) session split flowchart during a RAN initiated PDU session resource modification procedure in accordance with 3GsPP standard document TS37.340.

FIG. 4 illustrates an exemplary packet data unit (PDU) session split flowchart during a RAN initiated PDU session resource modification procedure in accordance with 3GPP standard document TS37.340.

As shown in FIG. 4, in step 1 and step 2, if a MN (e.g., MN 102 as illustrated and shown in FIG. 1) decides to split a PDU session, it uses a SN Addition procedure or a MN-initiated SN Modification procedure, including current UPF UL NG-U tunnel used at the MN. If an in-order delivery is required for some QoS flows, an UL forwarding tunnel may be setup for the PDU session at this stage. In a case that the MN offloads some QoS flows to a SN (e.g., SN 103 as illustrated and shown in FIG. 1) within a PDU session already split between the MN and the SN, the MN initiated SN Modification procedure is used.

As shown in FIG. 4, from step 3 to step 6d, if an in-order delivery is required, the SN buffers packet(s) firstly received from a UE (e.g., UE 101 as illustrated and shown in FIG. 1) for a certain QoS flow until it receives a general packet radio service (GPRS) tunneling protocol-user plane (GTP-U) end marker packet over the UL forwarding tunnel indicating that the MN has delivered all UL packets from the source side to a 5GC (e.g., an UPF) for that QoS flow. Then, the SN starts delivering UL packets to the UPF for that QoS flow using the UPF UL TEID address used at the MN received at step 1.

As shown in steps 7 and 8 of FIG. 4, the MN uses the PDU Session Resource Modify Indication message to inform the 5GC that the PDU session is split into two tunnels and indicate which QoS flows are associated with which downlink (DL) tunnel. The 5GC confirms with the PDU Session Resource Modify Confirm message and allocates corresponding uplink tunnels.

As shown in steps 9 and 10 of FIG. 4, if the MN receives a new UL TEID in the PDU Session Resource Modify Confirm message for itself, the MN will use it to deliver UL packets to UPF. If the MN receives a new UL TEID for the SN, the MN-initiated SN Modification procedure (i.e., step 9 and step 10) is used to provide the new UL TEID to the SN and then the SN switches to use the new UL TEID to deliver UL packets.

According to agreements of 3GPP standard documents, a conditional PSCell addition and change (CPAC) procedure is defined as a PSCell addition or change that is executed by a UE when execution condition(s) is met. A UE starts evaluating the execution condition(s) upon receiving the CPAC configuration, and stops evaluating the execution condition(s) once PSCell addition or change is triggered. The following principles apply to a CPAC procedure:

The CPAC configuration contains the configuration information of CPAC candidate cell(s) and execution condition(s) generated by the MN or the SN.

An execution condition may consist of one or two trigger condition(s) (CPC event A3 or CPC event A5). Only single reference signal (RS) type is supported and at most two different trigger quantities (e.g., RSRP and RSRQ, RSRP and SINR, etc.) can be configured simultaneously for the evolution of CPAC execution condition of a single candidate PSCell.

Before any CPAC execution condition is satisfied, upon reception of PSCell addition command or PSCell change command or PCell change command, the UE executes the PSCell change procedure or the PCell change procedure, regardless of any previously received CPAC configuration. Upon the successful completion of PSCell change procedure or PCell change procedure, the UE releases all stored CPAC configurations.

While executing the CPAC procedure, the UE is not required to continue evaluating the execution condition of other candidate PSCell(s).

Once the CPAC procedure is executed successfully, the UE releases all stored CPAC configurations.

Upon the release of SCG, the UE releases the stored CPAC configurations.

In 3GPP Release 17, a 5G based MBS is going to be supported. Since supporting 5G MBS service is regarded as a new feature for a RAN node, both a 5G MBS supportive RAN node and a 5G MBS non-supportive RAN node will coexist. A service belonging to a MBS may also be named as a MBS service or the like. MBS services supported at different RAN nodes could be different. For example, some RAN node(s) is not supportive for a MBS service delivered in a shared mode from a CN. Besides, some MBS service(s) is considered as local service(s). For a Vehicle to everything (V2X) scenario, a public safety scenario, and other service scenario(s) provided locally, a multicast communication service or a broadcast communication service may be only available in a local service area (e.g., per a cell, a tracking area (TA), or other geographic metric) and for a specific time (e.g., during event hours, an emergency situation, or operation hours).

Some embodiments of the present application provide a mechanism for exchanging information relating to on-going MBS service(s) among RAN nodes in 3GPP 5G system or the like. In some embodiments of the present application, a RAN node handles a MBS service at another RAN node in a handover scenario or in a MR-DC scenario in 3GPP 5G system or the like. In a MR-DC scenario, some embodiments of the present application request a SN to provide, to a UE, MBS service(s) which is on-going at the SN but not on-going at a MN. Such procedure can be initiated by either a MN or a SN. In a MR-DC scenario, some embodiments of the present application request a SN to provide a QoS flow of a MBS service to a UE. In a handover scenario, some embodiments of the present application simplify a handover preparation signaling by indicating a MBS service instead of a full list of radio bearer to admit to a target BS.

Some embodiments of the present application focus on handling of an existing MBS service at a SN and it's assumed that a RAN node is aware of a UE's interest of multicast services (e.g., from a 5GC after joining a MBS service) and broadcast services (e.g., indicated from a UE). In the embodiments of the present application, a multicast radio bearer (MRB) can be either a PTP radio bearer or a PTM radio bearer. In addition, a MBS service can be regarded equivalent as a MBS session.

In particular, in some embodiments of the present application, a RAN node is able to know a UE's interested MBS services as well as on-going MBS service(s) at other neighbour RAN nodes via any of the following ways:

(1) During a Xn interface setup procedure, a SN addition procedure, and/or a SN modification procedure, another RAN node (e.g., a SN) informs the RAN node (e.g., a MN) about the on-going MBS service(s) via a Xn interface message.

(2) An AMF keeps the RAN node updated about the on-going MBS service(s) at its neighbour RAN nodes via a N2 interface message.

In these embodiments, the on-going MBS service(s) at other neighbour RAN nodes may be identified by, e.g., a temporary mobile group identity (TMGI), a session identity (ID), and/or a MBS service ID.

In some embodiments of the present application, a MN or a SN initiates a procedure to establish a corresponding MRB and transmits the MBS service data anchored at the SN to a UE due to:

(1) when a MN or a SN realizes that an existing MBS service of a UE's interest is on-going at the SN but not anchored at MN (e.g., the MN is not MBS supportive, or the MN is out of the MBS service area).

(2) when a MN simply wants to stop the whole MBS service transmission or stop transmission of some flows of the whole MBS service and asks a UE to receive the same MBS service from a SN.

Some embodiments of the present application handle a handover procedure without requesting admission from a target RAN node. In a handover scenario, if a source RAN node is aware that the same MBS service is currently on-going at a target RAN node, a HANDOVER REQUEST message, sent from the source RAN node to the target RAN node, may not explicitly request a certain PDU session to be admitted by the target RAN node. Instead, the HANDOVER REQUEST message can include the MBS service information (e.g., a TMGI, a session ID, and/or MBS service ID) currently on-going at the source RAN node. Then, the target RAN node can provide the MRB configuration for the same MBS service and QoS flow to a UE.

Some embodiments of the present application provide a mechanism for performing a CPAC procedure considering information relating to on-going MBS service(s) at RAN node(s). Before starting a CPAC procedure, a UE may consider on-going MBS service(s) at a candidate cell or a candidate RAN node (e.g., a SN in a MR-DC scenario) as well execution condition(s) of the CPAC procedure.

More details regarding the embodiments of the present application will be illustrated in the following text in combination with the appended drawings. Following definitions are assumed in the embodiments of FIGS. 5-13:

Master Cell Group: in a MR-DC scenario, a group of serving cells associated with the Master Node, comprising of the SpCell (PCell) and optionally one or more SCells.

Secondary Cell Group: in a MR-DC scenario, a group of serving cells associated with the Secondary Node, comprising of the SpCell (PSCell) and optionally one or more SCells.

Secondary node: in a MR-DC scenario, the radio access node, with no control plane connection to the core network, providing additional resources to the UE. It may be an en-gNB (in EN-DC), a Secondary ng-eNB (in NE-DC) or a Secondary gNB (in NR-DC and NGEN-DC).

SCG bearer: in a MR-DC scenario, a radio bearer with an RLC bearer (or two RLC bearers, in case of CA packet duplication in an E-UTRAN cell group, or up to four RLC bearers in case of CA packet duplication in a NR cell group) only in the SCG.

SpCell: a primary cell of a master or secondary cell group.

signaling radio bearer (SRB) 3: in EN-DC, NGEN-DC and NR-DC, a direct SRB between the SN and the UE.

Split bearer: in a MR-DC scenario, a radio bearer with RLC bearers both in MCG and SCG.

Figure 5:
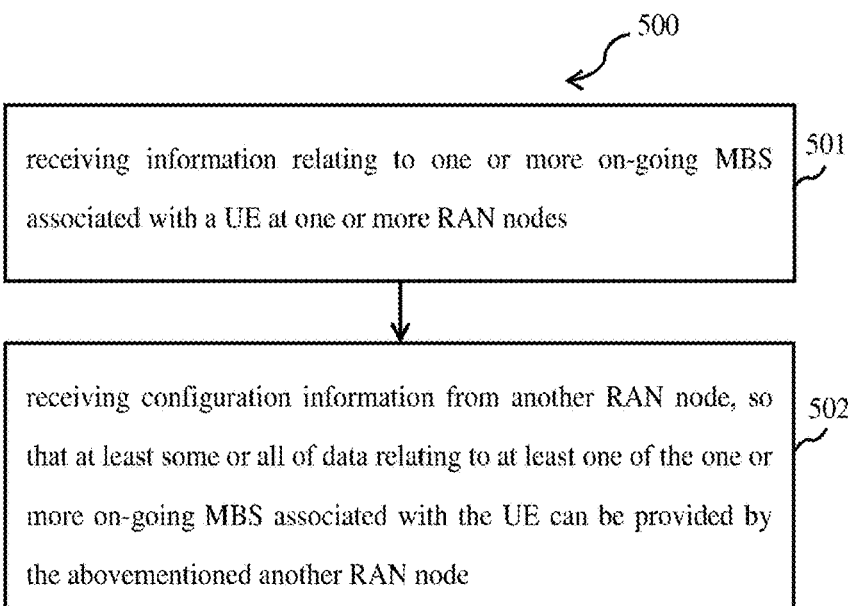
FIG. 5 illustrates an exemplary flowchart of a method for receiving information relating to an on-going MBS service at a RAN node in accordance with some embodiments of the present application.

FIG. 5 illustrates an exemplary flowchart of a method for receiving information relating to an on-going MBS service at a RAN node in accordance with some embodiments of the present application. The exemplary method 500 in the embodiments of FIG. 5 may be performed by a RAN node, for example:

a MN in a MR-DC scenario (e.g., MN 102, MN, MN 20, MN 720, MN 820, MN 21, or MN 1120 as illustrated and shown in any of FIGS. 1, 4, 6A, 6B, 7, 8, 10A, 10B, and 11, respectively); or RAN node 10 as illustrated and shown in FIG. 13; or a source node during a handover procedure.

Although described with respect to a RAN node, it should be understood that other devices may be configured to perform a method similar to that of FIG. 5. The embodiments of FIG. 5 assume that a MN may be combined in any one of EN-DC, NGEN-DC, NE-DC, and NR-DC scenarios.

In the exemplary method 500 as shown in FIG. 5, in operation 501, a RAN node receives information relating to one or more on-going MBS associated with a UE at one or more RAN nodes. In operation 502, the RAN node receives configuration information from another RAN node, so that at least some or all of data relating to at least one of the one or more on-going MBS associated with the UE can be provided by the abovementioned another RAN node. In some embodiments, the one or more RAN nodes are neighbor RAN nodes of the RAN node. The abovementioned another RAN node belongs to the one or more RAN nodes.

According to some embodiments of the present application, the RAN node is a MN (e.g., MN 102 as illustrated and shown in FIG. 1) in a MR-DC scenario, and the abovementioned another RAN node is a SN (e.g., SN 103 as illustrated and shown in FIG. 1) in the MR-DC scenario. According to some other embodiments, the RAN node is a source node during a handover procedure, and the abovementioned another RAN node is a target node during the handover procedure.

For example, the one or more on-going MBS associated with the UE (e.g., UE 101 as illustrated and shown in FIG. 1) at the one or more RAN nodes refer to MBS service(s) of an interest of the UE which are on-going at the one or more RAN nodes. A MBS service which is on-going at a RAN node may also be named as "a MBS service anchored at a RAN node", "a MBS service operating at a RAN node", or the like.

According to some embodiments of the present application, in operation 501 of FIG. 5, the information relating to the one or more on-going MBS associated with the UE at the one or more RAN nodes is received over a Xn interface message, a X2 interface message, and/or a N2 interface message. This information may indicate a TMGI, a session ID, and/or a MBS service ID. In an example, this information is received from an access and mobility management function (AMF) via a N2 interface. In a further example, this information is received during at least one of following procedures:

(1) a Xn interface setup procedure;
(2) a X2 interface setup procedure;
(3) a SN addition procedure;
(4) a secondary gNB (SgNB) addition procedure;
(5) a SN modification procedure; and
(6) a SgNB modification procedure.

According to some embodiments, the RAN node receives updated information relating to the one or more on-going MBS associated with the UE at the one or more RAN nodes. This updated information may indicate a TMGI, a session ID, and/or a MBS service ID.

According to some embodiments, the configuration information received in operation 502 of FIG. 5 is included in a X2 interface message, a Xn interface message, a container in a radio resource control (RRC) message, and/or a RRC reconfiguration message. For instance, the RAN node receives the configuration information from a SN addition request acknowledge message and/or a SN modification request acknowledge message via the Xn interface.

The received configuration information may be associated with multicast radio bearer (MRB) and may also be named as MRB configuration or the like. In an embodiment, after receiving the configuration information from the abovementioned another RAN node in operation 502, the RAN node (e.g., MN 720 as illustrated and shown in FIG. 7) transmits or forwards the configuration information to the UE (e.g., UE 710 as illustrated and shown in FIG. 7).

Figure 7:
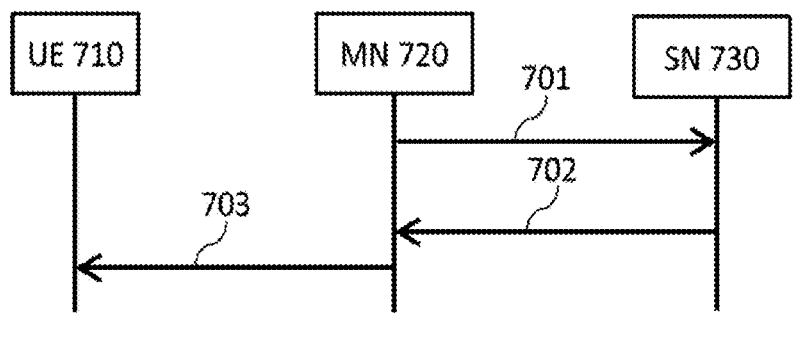
FIG. 7 illustrates an exemplary flowchart of receiving data associated with a MBS service at a SN initiated by a MN in a MR-DC scenario in accordance with some embodiments of the present application.

According to some embodiments, the RAN node transmits a request message to the abovementioned another RAN node (e.g., operation 701 in FIG. 7). A specific example is described in FIG. 7. This request message requests the abovementioned another RAN node to provide an on-going MBS associated with the UE at the abovementioned another RAN node. This request message may be included in a X2 interface message and/or a Xn interface message. For example, during a SN addition procedure, this request message may be transmitted in a SN addition request message via the Xn interface. During a SN modification procedure, this request message may be transmitted in a SN modification request message via the Xn interface.

Figure 8:
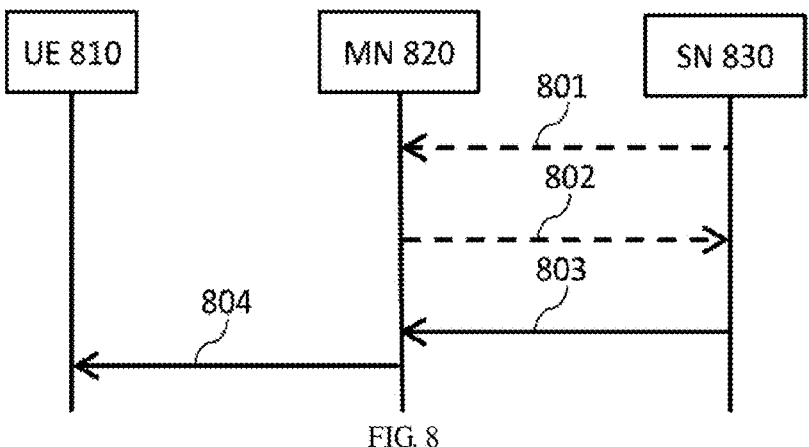
FIG. 8 illustrates an exemplary flowchart of receiving data associated with a MBS service at a SN initiated by the SN in a MR-DC scenario in accordance with some embodiments of the present application.

According to some other embodiments, the RAN node receives an offer message from the abovementioned another RAN node (e.g., operation 801 in FIG. 8). A specific example is described in FIG. 8. The offer message may include information relating to an on-going MBS associated with the UE at the abovementioned another RAN node. After receiving the offer message, the RAN node determines whether to accept or reject the offer message. If the RAN node determines to accept the offer message, the RAN node may transmit an accept message to the abovementioned another RAN node, whereas if the RAN node determines to reject the offer message, the RAN node may transmit a reject message to the abovementioned another RAN node.

According to some additional embodiments, if an on-going MBS associated with the UE at the RAN node is the same as an on-going MBS associated with the UE at the abovementioned another RAN node (e.g., the same MBS service of the UE's interest is on-going at both the RAN node and the abovementioned another RAN node), the RAN node may transmit a request message to the abovementioned another RAN node (e.g., operation 1101 in FIG. 11), to request the abovementioned another RAN node to provide QoS flow(s) relating to the on-going MBS associated with the UE. A specific example is described in FIG. 11. For instance, this request message includes: information relating to the on-going MBS associated with the UE at the abovementioned another RAN node; and/or an ID of a QoS flow within the QoS flow(s) relating to the on-going MBS associated with the UE at the RAN node. This request message may be transmitted in a X2 interface message and/or a Xn interface message. For example, during a SN addition procedure, this request message may be transmitted in a SN addition request message via the Xn interface; and during a SN modification procedure, this request message may be transmitted in a SN modification request message via the Xn interface.

Figure 11:
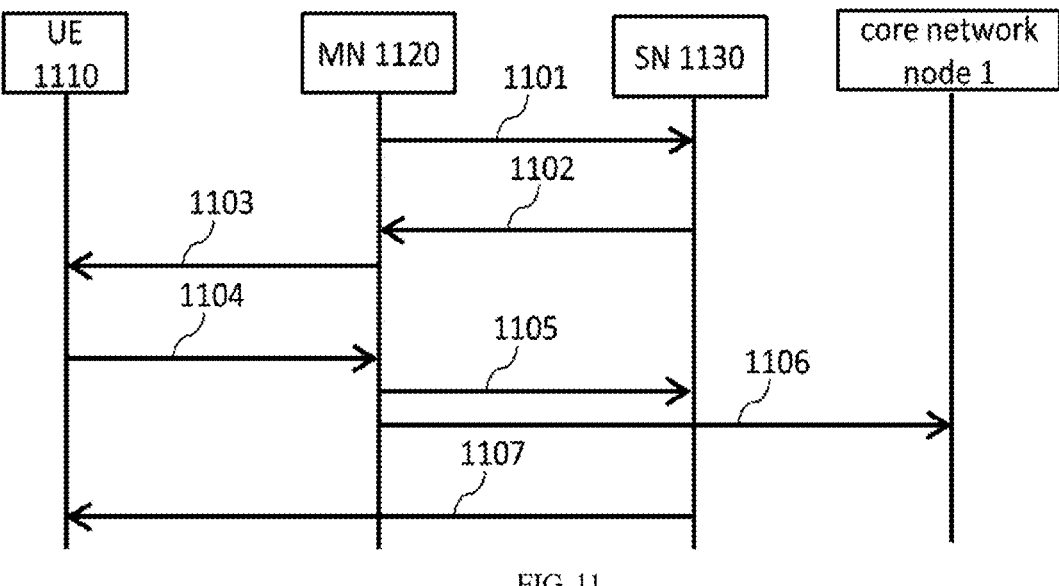
FIG. 11 illustrates a further exemplary flowchart of receiving data associated with a MBS service at a SN initiated by a MN in a MR-DC scenario in accordance with some embodiments of the present application.

In these additional embodiments, the RAN node may receive a RRC reconfiguration complete message from the UE (e.g., operation 1104 in FIG. 11), and then transmit a reconfiguration complete message to the abovementioned another RAN node (e.g., operation 1105 in FIG. 11) and/or a core network node (e.g., 5GC) (e.g., operation 1106 in FIG. 11). After that, the RAN node may stop data transmission relating to the on-going MBS associated with the UE at the RAN node, or the RAN node may stop transmission of a QoS flow within the QoS flow(s) relating to the on-going MBS associated with the UE at the RAN node.

The reconfiguration complete message transmitted by the RAN node may be a SN reconfiguration complete message and/or a stop message. The stop message indicates the abovementioned another RAN node and/or the core network node to: stop data transmission relating to the on-going MBS associated with the UE to the RAN node; and stop transmission of a QoS flow within the QoS flow(s) relating to the on-going MBS associated with the UE to the RAN node. The stop message may include: information relating to the on-going MBS associated with the UE at the abovementioned another RAN node; and/or an ID of a QoS flow within the QoS flow(s) relating to the on-going MBS associated with the UE at the RAN node.

Some embodiments of FIG. 5 assume that there is a MN terminated split bearer operating at the MN and the MN realizes that a SN has an existing on-going MBS service, and then, the MN does not need to forward the DL data to the SN to transmit in a SCG leg of the split bearer. Instead, the MN can request the SN to start delivering the MBS service data via the SCG leg of the split bearer.

Specifically, according to these embodiments of FIG. 5, if a split bearer terminated by the RAN node (e.g., MN 102 as illustrated and shown in FIG. 1) is operating at the RAN node and if an on-going MBS at the abovementioned another RAN node (e.g., SN 103 as illustrated and shown in FIG. 1) is associated with the UE, the RAN node may transmit a request message to the abovementioned another RAN node, to request the abovementioned another RAN node to start data deliver of the on-going MBS associated with the UE at the abovementioned another RAN node via a SCG leg of the split bearer. This request message may include: information relating to the on-going MBS associated with the UE at the abovementioned another RAN node; and/or an ID of a QoS flow within QoS flow(s) relating to the on-going MBS associated with the UE at the RAN node. The information relating to the on-going MBS associated with the UE at the abovementioned another RAN node may indicate a TMGI, a session ID, and/or a MBS service ID.

In addition, in these embodiments, the RAN node may further transmit a sequence number associated with the split bearer to the abovementioned another RAN node. The sequence number indicates a packet that has been delivered in a DL via the split bearer. For instance, the sequence number is transmitted in a Xn control plane interface (Xn-C) message and/or a Xn user plane interface (Xn-U) message.

Some embodiments of FIG. 5 refer to a handover scenario, in which the RAN node transmits a handover request message to the abovementioned another RAN node. The handover request message may include information relating to an on-going MBS associated with the UE at the RAN node, when the on-going MBS associated with the UE at the RAN node is the same as an on-going MBS associated with the UE at the abovementioned another RAN node. The information relating to the on-going MBS associated with the UE at the RAN node indicates a TMGI, a session ID, and/or a MBS service ID.

Details described in all other embodiments of the present application (for example, details of a mechanism for receiving information relating to an on-going MBS service) are applicable for the embodiments of FIG. 5. Moreover, details described in the embodiments of FIG. 5 are applicable for all the embodiments of FIGS. 1-4 and 6-13.

Figure 6A:
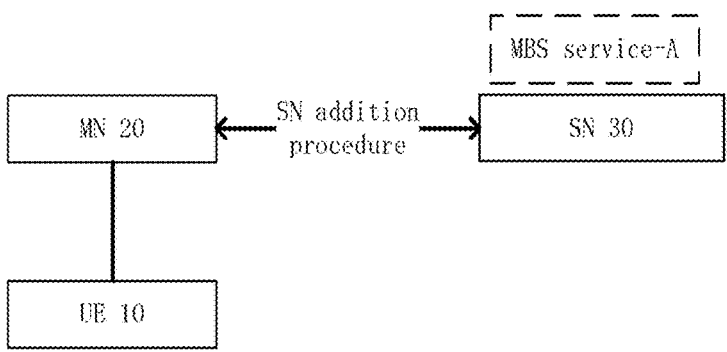
FIG. 6A illustrates an exemplary case of a MBS service of a UE's interest but not supported by a MN in a MR-DC scenario in accordance with some embodiments of the present application.

FIG. 6A illustrates an exemplary case of a MBS service of a UE's interest but not supported by a MN in a MR-DC scenario in accordance with some embodiments of the present application.

The embodiments of FIG. 6A assume that in a MR-DC scenario, some MBS services (e.g., MBS service-A as shown in FIG. 6A) could be of an interest of UE 10 (e.g., UE 101 as illustrated and shown in FIG. 1) but not supported by MN 20 (e.g., MN 102 as illustrated and shown in FIG. 1), and MBS service-A might be already on-going at SN 30 (e.g., SN 103 as illustrated and shown in FIG. 1) for other UEs supporting a MBS service under a coverage of SN 30.

In order for UE 10 to receive MBS service-A, the relevant MRB configuration should be provided to UE 10. In the legacy MR-DC scenario, a PDU session and QoS flow handling is about the PDU session and QoS flow originally mounted at MN 20. It is upon MN 20's decision whether to offload a QoS flow to SN 30 and what is the relevant radio bearer configuration information.

According to the embodiments of FIG. 6A, UE 10 may be connected to SN 30 via a SN addition procedure. In order that UE 10 may receive MBS service-A, some embodiments of the subject application (e.g., the embodiments of any of FIGS. 5, 7, and 8) provide solutions to inform SN 30 about UE 10's interest on MBS service-A or UE 10's subscription on MBS service-A. In these embodiments, SN 30 may provide information relating to UE 10's interest on MBS service-A or information relating to UE 10's subscription on MBS service-A and may provide relevant radio bearer configuration information on MBS service-A proactively or based on a request. A specific example is shown in FIG. 6B.

Figure 6B:
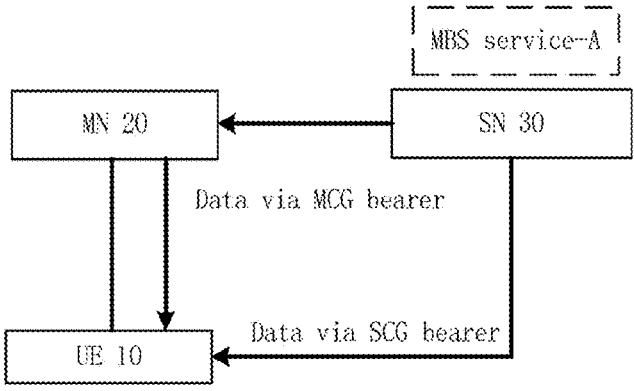
FIG. 6B illustrates an exemplary case of receiving a MBS service provided by a SN after adding the SN in a MR-DC scenario in accordance with some embodiments of the present application.

FIG. 6B illustrates an exemplary case of receiving a MBS service provided by a SN after adding the SN in a MR-DC scenario in accordance with some embodiments of the present application.

As shown in FIG. 6B, although MBS service-A is of UE 10's interest and supported by SN 30 but not supported by MN 20, through solutions of any of FIGS. 5, 7, and 8, UE 10 receives MBS service-A by receiving data via SCG bearer directly from SN 30 and receiving data via MCG bearer indirectly from SN 30 through MN 20.

Details described in all other embodiments of the present application (for example, details of a mechanism for exchanging information relating to a MBS service) are applicable for the embodiments of FIGS. 6A and 6B. Moreover, details described in the embodiments of FIGS. 6A and 6B are applicable for all the embodiments of FIGS. 1-5 and 7-13.

FIG. 7 illustrates an exemplary flowchart of receiving data associated with a MBS service at a SN initiated by a MN in a MR-DC scenario in accordance with some embodiments of the present application.

As shown in the embodiments of FIG. 7, in operation 701, MN 720 (e.g., MN 102 as illustrated and shown in FIG. 1) transmits a request to SN 730 (e.g., SN 103 as illustrated and shown in FIG. 1), to request SN 730 to provide a MBS service on-going at SN 730. The MBS service on-going at SN 730 may also be named as a MBS service anchored at SN 730 or the like. The request transmitted in operation 701 may include information relating to the MBS service on-going at SN 730, for instance, a TMGI, a session ID, and/or a MBS service ID. The request may be transmitted by sending a Xn interface message. The request may also be named as a MBS service request or the like.

According to some embodiments, upon receiving the MBS service request from MN 720, SN 730 may either accept or reject the request. If SN 730 accepts the MBS service request, SN 730 generates and provides MRB configuration information for that MBS service and sends to MN 720. In operation 702, SN 730 sends the MRB configuration information to MN 720, for instance, via a X2 interface message, a Xn interface message, a container in a RRC message, and/or a RRC reconfiguration message. The container in a RRC message may contain RRC reconfiguration information and may also be named as a RRC container or the like.

According to some embodiments, the MBS service request in operation 701 and/or the MRB configuration information in operation 702 may be nested in an existing UE associated Xn messages. For example, the MBS service request is nested in a SN ADDITION REQUEST message and/or a SN MODIFICATION REQUEST message. The MRB configuration information is nested in a SN ADDITION REQUEST ACKNOWLEDGE message and/or a SN MODIFICATION REQUEST ACKNOWLEDGE message.

According to some other embodiments, when multiple UEs are interested in the same on-going MBS service at SN 730, the MBS service request and/or the MRB configuration information can be sent in a non-UE associated Xn interface message.

According to some embodiments, if MN 720 receives the MRB configuration information in a Xn interface message, MN 720 generates a RRCReconfiguration message based on the received MRB configuration and sends it to UE 710 in operation 703. If MN 720 receives the MRB configuration information in a container in a RRC message, MN 720 may forward the container to UE 710 without making any modification.

Details described in all other embodiments of the present application (for example, details of a mechanism for requesting information relating to an on-going MBS service) are applicable for the embodiments of FIG. 7. Moreover, details described in the embodiments of FIG. 7 are applicable for all the embodiments of FIGS. 1-6 and 8-13.

According to some embodiments of the present application, a SN (e.g., SN 103 as illustrated and shown in FIG. 1) can offer a MBS service on-going at the SN to a MN (e.g., MN 102 as illustrated and shown in FIG. 1) by either sending a MBS service offer message (which is used for the MN to accept) or sending relevant MRB configuration message to the MN directly. The MBS service offer message and the MRB configuration message includes the MBS service's information, e.g., a TMGI, a session ID, and/or a MBS service ID. A specific example is shown in FIG. 8.

FIG. 8 illustrates an exemplary flowchart of receiving data associated with a MBS service at a SN initiated by the SN in a MR-DC scenario in accordance with some embodiments of the present application.

As shown in the embodiments of FIG. 8, in operation 801, SN 830 (e.g., SN 103 as illustrated and shown in FIG. 1) transmits a MBS service offer to MN 820 (e.g., MN 102 as illustrated and shown in FIG. 1). The MBS service offer may include information relating to an on-going MBS service at SN 830, e.g., a TMGI, a session ID, and/or a MBS service ID. The MBS service offer may also be named as an offer for a MBS service or the like. Upon receiving the MBS service offer from SN 830, MN 820 can either accept or reject the MBS service offer. Then, MN 820 may send an accept message or a reject message to SN 830 in operation 802. The operations 801 and 803 are optional in the embodiments of FIG. 8, and thus are marked as dotted lines. The messages transmitted in operations 801 and 802 may be collectively named as "MBS service offering signalling" or the like.

According to some embodiments, upon determining that MN 820 accepts the MBS service offer or the MBS service offering signalling (i.e., both operations 801 and 802 in FIG. 8) is skipped, SN 830 may generate and provide MRB configuration information for that MBS service. In operation 803, SN 830 sends the MRB configuration information to MN 820, e.g., as a Xn interface message or as a RRC container (containing RRCReconfiguration).

According to some embodiments, the MBS service offer in operation 801 and/or the MRB configuration information in operation 803 can be nested in existing UE associated Xn interface messages. For example, the MBS service offer is nested in a SN ADDITION REQUEST message and/or a SN MODIFICATION REQUEST message. The MRB configuration information is nested in a SN ADDITION REQUEST ACKNOWLEDGE message and/or a SN MODIFICATION REQUEST ACKNOWLEDGE message.

According to some other embodiments, when multiple UEs are interested in the same on-going MBS service at SN 830, the MBS service offer in operation 801 and the MRB configuration information in operation 803 can be sent in a non-UE associated Xn interface message.

According to some embodiments, if MN 820 receives the MRB configuration information in a Xn interface message, MN 820 may generate a RRCReconfiguration message based on the received MRB configuration. In operation 804, MN 820 sends the RRCReconfiguration message to UE 810. According to some other embodiments, if MN 820 receives the MRB configuration information in a RRC container, MN 820 transmits the RRC container in operation 804, without modifying the RRC container.

Details described in all other embodiments of the present application (for example, details of a mechanism for receiving MBS capability information) are applicable for the embodiments of FIG. 8. Moreover, details described in the embodiments of FIG. 8 are applicable for all the embodiments of FIGS. 1-7 and 9-13.

Figure 9:
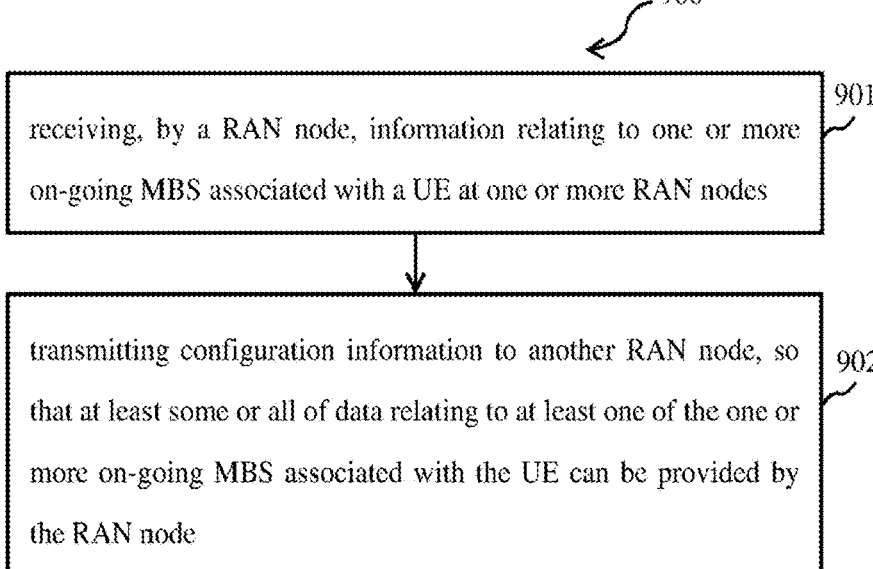
FIG. 9 illustrates a further exemplary flowchart of a method for receiving information relating to an on-going MBS service at a RAN node in a RAN in accordance with some embodiments of the present application.

FIG. 9 illustrates a further exemplary flowchart of a method for receiving information relating to an on-going MBS service at a RAN node in a RAN in accordance with some embodiments of the present application. The exemplary method 900 in the embodiments of FIG. 9 may be performed by a RAN node, for example:

a SN (e.g., SN 103, SN, SN 30, SN 730, SN 830, SN 31, or SN 1130 as illustrated and shown in any of FIGS. 1, 4, 6A, 6B, 7, 8, 10A, 10B, and 11, respectively); or RAN node 10 as illustrated and shown in FIG. 13); or a target node during a handover procedure.

Although described with respect to a RAN node, it should be understood that other devices may be configured to perform a method similar to that of FIG. 9. The embodiments of FIG. 9 assume that a SN may be combined in any one of EN-DC, NGEN-DC, NE-DC, and NR-DC scenarios.

In the exemplary method 900 as shown in FIG. 9, in operation 901, a RAN node (e.g., SN 103 as illustrated and shown in FIG. 1) receives information relating to one or more on-going MBS associated with a UE (e.g., UE 101 as illustrated and shown in FIG. 1) at one or more RAN nodes. In operation 902, the RAN node transmits configuration information to another RAN node (e.g., MN 102 as illustrated and shown in FIG. 1), so that at least some or all of data relating to at least one of the one or more on-going MBS associated with the UE can be provided by the RAN node. The one or more RAN nodes may be neighbor RAN nodes of the RAN node. The abovementioned another RAN node belongs to the one or more RAN nodes. The one or more on-going MBS associated with the UE at one or more RAN nodes may be one or more MBS of the UE's interest which are on-going at one or more RAN nodes.

According to some embodiments of the present application, the RAN node is a SN (e.g., SN 103 as illustrated and shown in FIG. 1) and the abovementioned another RAN node is a MN (e.g., MN 102 as illustrated and shown in FIG. 1) in a MR-DC scenario. According to some other embodiments, the RAN node is a target node and the abovementioned another RAN node is a source node during a handover procedure.

According to some embodiments, in operation 901 of FIG. 9, the information relating to the one or more on-going MBS associated with the UE at the one or more RAN nodes is received over a Xn interface message, a X2 interface message, and/or a N2 interface message. This information may indicate a TMGI, a session ID, and/or a MBS service ID. In an example, this information is received from an AMF via a N2 interface. In a further example, this information is received during at least one of following procedures:

(1) a Xn interface setup procedure;
    (2) a X2 interface setup procedure;
    (3) a SN addition procedure;
    (4) a secondary gNB (SgNB) addition procedure;
    (5) a SN modification procedure; and
    (6) a SgNB modification procedure.

According to some embodiments, the RAN node receives updated information relating to the one or more on-going MBS associated with the UE at the one or more RAN nodes. This updated information may indicate a TMGI, a session ID, and/or a MBS service ID.

According to some embodiments, the configuration information transmitted in operation 902 of FIG. 9 is included in a X2 interface message, a Xn interface message, a container in a RRC message, and/or RRC reconfiguration message. For instance, the Xn interface message may be a SN addition request acknowledge message and/or a SN modification request acknowledge message. The configuration information transmitted in operation 902 may be associated with multicast radio bearer (MRB).

In an embodiment, after receiving the configuration information from the RAN node in operation 902, the above-mentioned another RAN node further forwards the configuration information to the UE.

According to some embodiments, the RAN node receives a request message from the abovementioned another RAN node (e.g., operation 701 in FIG. 7). A specific example is described in FIG. 7. This request message is for requesting the RAN node to provide an on-going MBS associated with the UE at the RAN node. This request message may be included in a X2 interface message and/or a Xn interface message. For example, during a SN addition procedure, this request message may be transmitted in a SN addition request message via the Xn interface. During a SN modification procedure, this request message may be transmitted in a SN modification request message via the Xn interface.

In these embodiments, after the RAN node receives the request message, the RAN node determines whether to accept or reject this request message. If the RAN node determines to accept this request message, the RAN node generates the configuration information which is transmitted in operation 902.

According to some other embodiments, the RAN node transmits an offer message to the abovementioned another RAN node (e.g., operation 801 in FIG. 8). A specific example is described in FIG. 8. The offer message may include information relating to an on-going MBS associated with the UE at the RAN node. After receiving the offer message, the abovementioned another RAN node determines whether to accept or reject the offer message. If the abovementioned another RAN node determines to accept the offer message, the abovementioned another RAN node may transmit an accept message to the RAN node, whereas if the abovementioned another RAN node determines to reject the offer message, the abovementioned another RAN node may transmit a reject message to the RAN node.

According to some additional embodiments, if an on-going MBS associated with the UE at the RAN node is the same as an on-going MBS associated with the UE at the abovementioned another RAN node, the RAN node receives a request message from the abovementioned another RAN node. This request message is for requesting the RAN node to provide QoS flow(s) associated with the on-going MBS associated with the UE at the RAN node. A specific example is described in FIG. 11. This request message may be included in a X2 interface message and/or a Xn interface message. For example, the Xn interface message is a SN addition request message and/or a SN modification request message. This request message may include: information relating to the on-going MBS associated with the UE at the RAN node; and/or an ID of a QoS flow within the QoS flow(s) associated with the on-going MBS associated with the UE at the RAN node.

In these additional embodiments, the RAN node may receive a reconfiguration complete message from the abovementioned another RAN node (e.g., operation 1105 in FIG. 11). After that, since the on-going MBS associated with the UE at the RAN node is the same as the on-going MBS associated with the UE at the abovementioned another RAN node, the RAN node may transmit data of a QoS flow within QoS flow(s) associated with the on-going MBS associated with the UE at the RAN node, to the UE. For instance, the reconfiguration complete message is a SN reconfiguration complete message.

According to some additional embodiments, if a split bearer terminated by the abovementioned another RAN node is operating at the abovementioned another RAN node and if an on-going MBS at the RAN node is associated with the UE, the RAN node receives a request message from the abovementioned another RAN node. This request message is for requesting the RAN node to start data delivery of the on-going MBS associated with the UE at the RAN node via a SCG leg of the split bearer. This request message may include: information relating to the on-going MBS associated with the UE at the RAN node; and/or an ID of a QoS flow within QoS flow(s) associated with the on-going MBS associated with the UE at the abovementioned another RAN node. The information relating to the on-going MBS associated with the UE at the RAN node may indicate a TMGI, a session ID, and/or a MBS service ID.

In these additional embodiments, the RAN node may further receive a sequence number associated with the split bearer from the abovementioned another RAN node. The sequence number indicates a packet that has been delivered in the DL via the split bearer. For instance, the sequence number is transmitted in a Xn-C message and/or a Xn-U message.

In some embodiments of a handover scenario, the RAN node receives a handover request message from the abovementioned another RAN node. The handover request message may include information relating to an on-going MBS associated with the UE at the abovementioned another RAN node, when the on-going MBS associated with the UE at the RAN node is the same as an on-going MBS associated with the UE at the abovementioned another RAN node. The information relating to the on-going MBS associated with the UE at the RAN node indicates a TMGI, a session ID, and/or a MBS service ID.

According to some embodiments, after the RAN node receives a handover request message from the abovementioned another RAN node, the RAN node transmits the configuration information (which is transmitted in operation 902) to the UE and transmits data relating to a QoS flow associated with the on-going MBS associated with the UE at the RAN node, to the UE.

According to some embodiments, if the RAN node determines that a MBS associated with the UE is supported by the RAN node but not supported by the abovementioned another RAN node, the RAN node triggers a procedure to establish a packet data unit (PDU) session or a MBS session for the MBS associated with the UE.

In particular, in an embodiment, when a SN realizes that one MBS service can be supported at the SN but not supported at a MN the SN triggers a procedure to establish a corresponding PDU session or a MBS session from a CN for that MBS service. Then, the SN can offer the newly established MBS service to the MN following the embodiments that the MN or the SN initiates a procedure to establish a corresponding MRB and then transmits the MBS service data anchored at the SN to a UE.

Details described in all other embodiments of the present application (for example, details of a mechanism for receiving information relating to an on-going MBS service) are applicable for the embodiments of FIG. 9. Moreover, details described in the embodiments of FIG. 9 are applicable for all the embodiments of FIGS. 1-8 and 10-13.

Figure 10A:
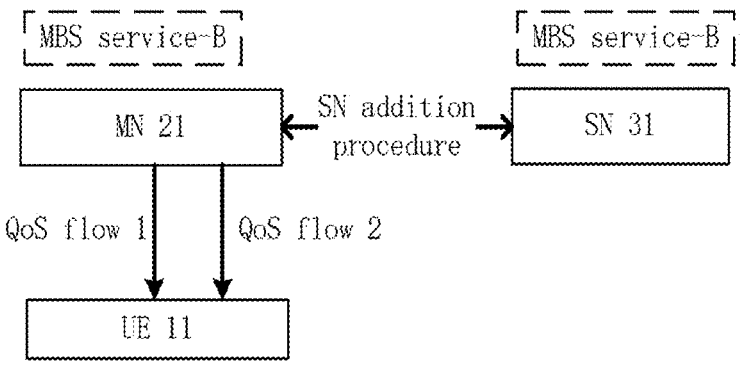
FIG. 10A illustrates an exemplary case needing to offload a MBS quality of service (QoS) flow to a SN in a MR-DC scenario in accordance with some embodiments of the present application.

FIG. 10A illustrates an exemplary case needing to offload a MBS quality of service (QoS) flow to a SN in a MR-DC scenario in accordance with some embodiments of the present application.

The embodiments of FIG. 10A assume that in a MR-DC scenario, the same MBS service (e.g., MBS service-B as shown in FIG. 10A) is on-going at both MN 21 (e.g., MN 102 as illustrated and shown in FIG. 1) and SN 31 (e.g., SN 103 as illustrated and shown in FIG. 1). In a case that there are multiple QoS flows between MN 21 and UE 11 (e.g., UE 101 as illustrated and shown in FIG. 1), e.g., QoS flow 1 and QoS flow 2 of MBS service-B as shown in FIG. 10A, MN 21 could offload certain QoS flow(s) to SN 31 via a SN addition procedure, without splitting a PDU session.

Some embodiments of the present application (e.g., FIGS. 9 and 11) provide solutions in which MN 21 requests SN 31 to start transmitting data from a MBS service anchored at SN 31, and SN 31 provides relevant MRB configuration and starts sending the data, e.g., via a SN terminated SCG bearer. A specific example is shown in FIG. 10B.

Figure 10B:
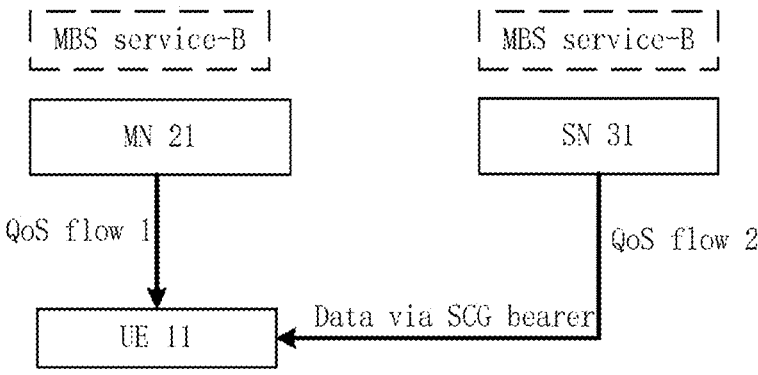
FIG. 10B illustrates an exemplary case of a MN offloading a MBS QoS flow to a SN in a MR-DC scenario in accordance with some embodiments of the present application.

FIG. 10B illustrates an exemplary case of a MN offloading a MBS QoS flow to a SN in a MR-DC scenario in accordance with some embodiments of the present application.

As shown in FIG. 10B, after adopting embodiments of the subject application (e.g., solutions of FIGS. 9 and 11), MN 21 offloads QoS flow 2 of MBS service-B to SN 31. UE 11 receives QoS flow 1 of MBS service-B from MN 21 and receives QoS flow 2 of MBS service-B from SN 31, i.e., data via SCG bearer.

Details described in all other embodiments of the present application (for example, details of a mechanism for offloading a MBS QoS flow) are applicable for the embodiments of FIGS. 10A and 10B. Moreover, details described in the embodiments of FIGS. 10A and 10B are applicable for all the embodiments of FIGS. 1-5 and 7-13.

According to some embodiments of the present application, when a MN realizes that an existing MBS service of a UE's interest is on-going at both the MN and a SN, the MN may request the UE to receive some QoS flow from the SN and stop transmission of that QoS flow at the MN. It can be done by MN sending a request to SN (instead of triggering a PDU session split in the legacy). A specific example is shown in FIG. 11.

FIG. 11 illustrates a further exemplary flowchart of receiving data associated with a MBS service at a SN initiated by a MN in a MR-DC scenario in accordance with some embodiments of the present application.

The embodiments of FIG. 11 assume that a PDU session or a MBS session for the same MBS service has been established at both MN 1120 (e.g., MN 102 as illustrated and shown in FIG. 1) and SN 1130 (e.g., SN 103 as illustrated and shown in FIG. 1).

According to the embodiments of FIG. 11, in operation 1101, MN 1120 sends a QoS flow request to SN 1130. The QoS flow request includes relevant MBS service information (e.g., a TMGI, a session ID, and/or a MBS service ID) as well as relevant QoS flow information (e.g., a QoS flow ID). The QoS flow request can be used to request two or more QoS flows of the same on-going MBS service at both MN 1120 and SN 1130. For instance, the QoS flow request contains a list of QoS flows.

According to some embodiments, upon receiving the QoS flow request from MN 1120, SN 1130 either accepts or rejects the QoS flow request. If SN 1130 accepts the QoS flow request, SN 1130 may generate and provide relevant MRB configuration information. In operation 1102, SN 1130 sends the MRB configuration information to MN 1120, e.g., via a Xn interface message or a RRC container (containing RRCReconfiguration).

According to some embodiments, the QoS flow request in operation 1101 and the MRB configuration information in operation 1102 can be nested in existing UE associated Xn interface messages. For example, the QoS flow request is nested in a SN ADDITION REQUEST message and/or a SN MODIFICATION REQUEST message. The MRB configuration is nested in a SN ADDITION REQUEST ACKNOWLEDGE message and/or a SN MODIFICATION REQUEST ACKNOWLEDGE message. According to some other embodiments, when multiple UEs are interested in the same MBS service at SN, the QoS flow request in operation 1101 and the MRB configuration information in operation 1102 can be sent in a non-UE associated Xn interface message.

According to some embodiments, if MN 1120 receives the MRB configuration information in a Xn interface message, MN 1120 generates a RRCReconfiguration message based on the received MRB configuration information. In operation 1103, MN 1120 sends the RRCReconfiguration message to UE 1110. If MN 1120 receives the MRB configuration information in a RRC container in operation 1103, MN 1120 forwards the container in operation 1103, without making any modification.

Referring back to FIG. 11, in operation 1104, UE 1110 transmits a RRCReconfiguration Complete message to MN 1120. Upon receiving the RRCReconfiguration Complete message from UE 1110, MN 1120 may inform both SN 1130 and core network node 1 (e.g., a 5GC node) about the completion. Core network node 1 may be session management function (SMF), AMF, or UPF. In operation 1105, MN 1120 transmits a SN Reconfiguration Complete message to SN 1130. In operation 1106, MN 1120 transmits a QoS flow stop message or a whole MBS service stop message to core network node 1. Then, MN 1120 stops any data transmission from the corresponding QoS flow or the whole MBS service.

The QoS flow stop message in operation 1106 may also be named as a message for stopping data transmission associated with a QoS flow or the like. For instance, relevant MBS service information (e.g., a TMGI, a session ID, and/or a MBS service ID) and relevant QoS flow information (e.g., a QoS flow ID) may be included in the QoS flow stop message sent to core network node 1 (e.g., SMF, AMF, or UPF). The QoS flow stop message may be named as stop signalling or the like.

According to some embodiments, upon receiving the SN Reconfiguration Complete message from MN 1120, SN

1130 starts data transmission from the corresponding QoS flow to UE 1110 using the previously configured MRB.

According to some embodiments, after core network node 1 receives the QoS flow stop message from MN 1120 in operation 1106:

(1) If core network node 1 is UPF, UPF stops data transmission of the stopped QoS flow to MN 1120.

(2) If core network node 1 is not UPF, core network node 1 informs the corresponding UPF and stops data transmission of the stopped QoS flow to MN 1120. If the QoS flow stop message is sent to AMF or SMF, AMF or SMF needs to inform UPF to stop data transmission.

Details described in all other embodiments of the present application (for example, details of a mechanism for transmitting a QoS flow request) are applicable for the embodiments of FIG. 11. Moreover, details described in the embodiments of FIG. 11 are applicable for all the embodiments of FIGS. 1-10 and 12-13.

FIG. 12 illustrates an exemplary flowchart of a method for receiving information relating to an on-going MBS service at a candidate RAN node or cell in accordance with some embodiments of the present application.

The exemplary method 1200 in the embodiments of FIG. 12 may be performed by a UE (e.g., UE 101 as shown and illustrated in FIG. 1, any one of UE 301 to UE 304 as shown and illustrated in FIG. 3, UE as shown and illustrated in FIG. 4, UE 10 as shown and illustrated in FIGS. 6A and 6B, UE 710 as shown and illustrated in FIG. 7, UE 810 as shown and illustrated in FIG. 8, UE 11 as shown and illustrated in FIGS. 10A and 10B, UE 1110 as shown and illustrated in FIG. 11, or UE 20 as shown and illustrated in FIG. 13). Although described with respect to a UE, it should be understood that other devices may be configured to perform a method similar to that of FIG. 12.

In the exemplary method 1200 as shown in FIG. 12, in operation 1201, a UE (e.g., UE 101 as shown and illustrated in FIG. 1) receives information relating to one or more on-going MBS at one or more candidate RAN nodes or cells. This information may be included in a RRC message. For example, this information is received from a RAN node, e.g., a MN or a SN in a MR-DC scenario.

In some embodiments, the information received in operation 1201 indicates: a TMGI of an on-going MBS within the one or more on-going MBS; a session ID of the on-going MBS within the one or more on-going MBS; and/or a MBS service ID of the on-going MBS within the one or more on-going MBS. For instance, this information may be received during at least one of following procedures:

(1) a Xn interface setup procedure;

(2) a X2 interface setup procedure;

(3) a SN addition procedure;

(4) a secondary gNB (SgNB) addition procedure;

(5) a SN modification procedure; and (6) a SgNB modification procedure.

Referring back to FIG. 12, in operation 1202, the UE receives configuration information from a RAN node. The RAN node may belong to or not belong to the one or more candidate RAN nodes or cells in different embodiments. The configuration information may be included in a RRC message. In operation 1203, the UE starts a CPAC procedure based on the received configuration information, so that some or all of data relating to at least one of the one or more on-going MBS can be received from at least one of the one or more candidate RAN nodes or cells.

According to some embodiments, the configuration information received in operation 1202 is conditional configuration information for the CPAC procedure and includes at least one of:

(1) execution condition(s) for the CPAC procedure; and (2) RRC reconfiguration information for each candidate RAN node or cell in the one or more candidate RAN nodes or cells, if the one or more on-going MBS are operating at each candidate RAN node or cell.

In these embodiments, based on a measurement of the UE, the UE may evaluate whether a candidate RAN node or cell within the one or more candidate RAN nodes or cells meets the execution condition(s) for the CPAC procedure. If one candidate RAN node or cell meets the execution condition(s) and if an on-going MBS at this candidate RAN node or cell is associated with the UE (e.g., be of the UE's interest), the UE may connect to this candidate RAN node or cell.

Alternatively, if two or more candidate RAN nodes or cells meet the execution condition(s), the UE may: prioritize these two or more candidate RAN nodes or cells; select a candidate RAN node or cell with a highest priority from the prioritized candidate RAN nodes or cells; and connect to the selected candidate RAN node or cell. In this case, if a MBS associated with the UE is on-going at RAN node(s) or cell(s) belonging to these two or more candidate RAN nodes or cells, but is not on-going at remaining node(s) or cell(s) belonging to these two or more candidate RAN nodes or cells, the UE may set one or more higher priorities to the one or more RAN nodes or cells than the remaining RAN nodes or cells.

Details described in all other embodiments of the present application (for example, details of a mechanism for receiving on-going MBS service information) are applicable for the embodiments of FIG. 12. Moreover, details described in the embodiments of FIG. 12 are applicable for all the embodiments of FIGS. 1-11 and 13.

FIG. 13 illustrates an exemplary block diagram of an apparatus according to some embodiments of the present application. In some embodiments of the present application, the apparatus 1300 may be a RAN node (e.g., a MN or a SN) or a UE, which can at least perform the method illustrated in any of FIGS. 5-12.

As shown in FIG. 13, the apparatus 1300 may include at least one receiver 1302, at least one transmitter 1304, at least one non-transitory computer-readable medium 1306, and at least one processor 1308 coupled to the at least one receiver 1302, the at least one transmitter 1304, and the at least one non-transitory computer-readable medium 1306.

Although in FIG. 13, elements such as the at least one receiver 1302, the at least one transmitter 1304, the at least one non-transitory computer-readable medium 1306, and the at least one processor 1308 are described in the singular, the plural is contemplated unless limitation to the singular is explicitly stated. In certain embodiments of the present application, the apparatus 1300 may further include an input device, a memory, and/or other components.

In some embodiments of the present application, the at least one receiver 1302 and the at least one transmitter 1304 are combined into a single device, such as a transceiver, for example, a wireless radio transceiver coupled to the at least one processor 1308. The wireless radio transceiver may be configured to at least perform the method illustrated in any of FIGS. 5-12.

In some embodiments of the present application, the at least one non-transitory computer-readable medium 1306 may have stored thereon computer-executable instructions which are programmed to implement the operations of the methods, for example as described in view of any of FIGS. 5-12, with the at least one receiver 1302, the at least one transmitter 1304, and the at least one processor 1308.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A network entity for wireless communication as a first radio access network (RAN) node, comprising:
   at least one memory; and
   at least one processor coupled with the at least one memory and configured to cause the network entity to:
      receive information relating to one or more on-going multicast broadcast service (MBS) for a user equipment (UE), the one or more on-going MBS being anchored at one or more RAN nodes including a second RAN node; and
      receive configuration information from the second RAN node to cause at least some or all of data relating to an on-going MBS of the one or more on-going MBS for the UE to be provided to the UE by the second RAN node, wherein the configuration information is received in response to:
         accepting an offer message from the second RAN node, wherein the offer message includes the information relating to the on-going MBS associated with the UE at the second RAN node; or
         transmitting a first request message to the second RAN node to request that the second RAN node provide the on-going MBS associated with the UE at the second RAN node.

2. The network entity of claim 1, wherein the at least one processor is configured to cause the network entity to:
   receive the offer message from the second RAN node, and at least one of:
   in response to a first determination to accept the offer message, transmit an accept message to the second RAN node; or
   in response to a second determination to reject the offer message, transmit a reject message to the second RAN node.

3. The network entity of claim 1, wherein the at least one processor is configured to cause the network entity to, in response to an on-going MBS associated with the UE at the first RAN node being a same as the on-going MBS associated with the UE at the second RAN node, transmit a second request message to the second RAN node, wherein the second request message requests the second RAN node to provide one or more quality of service (QoS) flows relating to the on-going MBS associated with the UE at the second RAN node.

4. The network entity of claim 3, wherein the at least one processor is configured to cause the network entity to:
   receive a radio resource control (RRC) reconfiguration complete message from the UE; and
   transmit a reconfiguration complete message to at least one of the second RAN node or a core network node.

5. The network entity of claim 4, wherein the at least one processor is configured to cause the network entity to:
   stop data transmission relating to the on-going MBS associated with the UE at the first RAN node; or
   stop transmission of a QoS flow within the one or more QoS flows relating to the on-going MBS associated with the UE at the first RAN node.

6. The network entity of claim 4, wherein the reconfiguration complete message is at least one of:
   a secondary node (SN) reconfiguration complete message; or
   a stop message, wherein the stop message indicates the at least one of the second RAN node or the core network node to:
      stop data transmission relating to the on-going MBS associated with the UE to the first RAN node; and
      stop transmission of a QoS flow within the one or more QoS flows relating to the on-going MBS associated with the UE to the first RAN node.

7. The network entity of claim 1, wherein the at least one processor is configured to cause the network entity to transmit a handover request message to the second RAN node.

8. The network entity of claim 7, wherein the handover request message includes information relating to an on-going MBS associated with the UE at the first RAN node, and wherein the on-going MBS associated with the UE at the first RAN node is a same as an on-going MBS associated with the UE at the second RAN node.

9. A network entity for wireless communication as a radio access network (RAN) node, comprising:
   at least one memory; and
   at least one processor coupled with the at least one memory and configured to cause the network entity to:
      receive information relating to one or more on-going multicast broadcast service (MBS) for a user equipment (UE), the one or more on-going MBS being anchored at one or more RAN nodes including the RAN node; and transmit configuration information to another RAN node to cause at least some or all of data relating an on-going MBS of the one or more on-going MBS for the UE to be provided to the UE by the RAN node, wherein the configuration information is transmitted in response to:

receiving an accept message from the another RAN node responsive to an offer message, the offer message including the information relating to the on-going MBS associated with the UE at the RAN node; or receiving a first request message from the another RAN node, the first request message requesting the RAN node to provide the on-going MBS associated with the UE at the RAN node.

10. The network entity of claim 9, wherein the at least one processor is configured to cause the network entity to transmit the offer message to the another RAN node, and at least one of receive the accept message from the another RAN node, or receive a reject message from the another RAN node.

11. The network entity of claim 9, wherein the at least one processor is configured to cause the network entity to, in response to an on-going MBS associated with the UE at the another RAN node being a same as the on-going MBS associated with the UE at the RAN node, receive a second request message from the another RAN node, the second request message requesting the RAN node to provide one or more quality of service (QoS) flows relating to the on-going MBS associated with the UE at the RAN node.

12. The network entity of claim 11, wherein the at least one processor is configured to cause the network entity to:

transmit a radio resource control (RRC) reconfiguration complete message to the UE; and receive a reconfiguration complete message from at least one of the another RAN node or a core network node.

13. The network entity of claim 12, wherein the at least one processor is configured to cause the network entity to:

stop data transmission relating to the on-going MBS associated with the UE at the RAN node; or stop transmission of a QoS flow within the one or more QoS flows relating to the on-going MBS associated with the UE at the RAN node.

14. The network entity of claim 12, wherein the reconfiguration complete message is at least one of:

a secondary node (SN) reconfiguration complete message; or a stop message that indicates the at least one of the another RAN node or the core network node to:

stop data transmission relating to the on-going MBS associated with the UE to the RAN node; and stop transmission of a QoS flow within the one or more QoS flows relating to the on-going MBS associated with the UE to the RAN node.

15. The network entity of claim 9, wherein the at least one processor is configured to cause the network entity to receive a handover request message from the another RAN node.

16. The network entity of claim 15, wherein the handover request message includes information relating to an on-going MBS associated with the UE at the RAN node, and wherein the on-going MBS associated with the UE at the RAN node is a same as an on-going MBS associated with the UE at the another RAN node.

17. A user equipment (UE) for wireless communication, comprising:

at least one memory; and at least one processor coupled with the at least one memory and configured to cause the UE to:

receive information relating to one or more on-going multicast broadcast services (MBS) anchored at one or more candidate radio access network (RAN) nodes;

receive configuration information from a RAN node;

start a conditional primary secondary cell (PSCell) additional and change (CPAC) procedure based on the received configuration information, at least some or all of data relating to an on-going MBS of the one or more on-going MBS being received from a candidate RAN node of the one or more candidate RAN nodes; and transmit a radio resource control (RRC) reconfiguration complete message to the candidate RAN node or a core network node.

18. The UE of claim 17, wherein the information relating to the one or more on-going MBS is received from the RAN node.

19. The UE of claim 17, wherein the at least one processor is configured to cause the UE to initiate transmission of a message that causes discontinuation of at least one of:

data transmission relating to the on-going MBS associated with the UE at a previous RAN node; or transmission of a quality of service (QoS) flow within one or more QoS flows relating to the on-going MBS associated with the UE at the previous RAN node.

20. The UE of claim 17, wherein the information relating to the one or more on-going MBS anchored at the one or more candidate RAN nodes includes an indication that the on-going MBS associated with the candidate RAN node is a same as an on-going MBS previously received by the UE.

* * * * *